(12) United States Patent
Klein

(10) Patent No.: US 8,317,397 B2
(45) Date of Patent: Nov. 27, 2012

(54) LINEAR BALL BEARING

(75) Inventor: Udo Klein, Adenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 305 days.

(21) Appl. No.: 12/671,359

(22) PCT Filed: Jul. 7, 2008

(86) PCT No.: PCT/EP2008/058770
§ 371 (c)(1),
(2), (4) Date: Mar. 16, 2010

(87) PCT Pub. No.: WO2009/016001
PCT Pub. Date: Feb. 5, 2009

(65) Prior Publication Data
US 2010/0189382 A1    Jul. 29, 2010

(30) Foreign Application Priority Data
Aug. 1, 2007 (DE) .......................... 10 2007 036 113

(51) Int. Cl.
*F16C 29/06* (2006.01)
*F16C 29/04* (2006.01)
(52) U.S. Cl. ............................ 384/43; 384/49
(58) Field of Classification Search .............. 384/43, 384/44, 46, 49; 403/13, 14
See application file for complete search history.

(56) References Cited

U.S. PATENT DOCUMENTS

| | | | | |
|---|---|---|---|---|
| 2,628,135 A | * | 2/1953 | Magee | 384/43 |
| 4,469,380 A | * | 9/1984 | Cowles, Sr. | 384/43 |
| 5,346,313 A | * | 9/1994 | Ng | 384/43 |
| 6,409,387 B1 | * | 6/2002 | Yokohari | 384/43 |
| 7,637,662 B2 | * | 12/2009 | Kato et al. | 384/43 |

FOREIGN PATENT DOCUMENTS

| | | |
|---|---|---|
| DE | 197 08 370 A1 | 9/1998 |
| EP | 0 004 593 A1 | 10/1979 |
| GB | 1 260 979 A | 1/1972 |
| WO | 00/25034 A | 5/2000 |

* cited by examiner

*Primary Examiner* — James Pilkington
*Assistant Examiner* — Adam D Rogers
(74) *Attorney, Agent, or Firm* — Lucas & Mercanti, LLP; Klaus P. Stoffel

(57) ABSTRACT

A linear ball bearing with a substantially sleeve-like cage for receiving axial ball loops distributed across the circumference of the cage. Each ball loop has a first ball channel open radially to the inside and outside for the row of the carrying ball, and a second ball channel open radially towards the outside for the row of the non-carrying balls and has deflection channels connecting the ball channels of a ball loop to each other. At least the first ball channel is covered on the outside by a load-bearing carrier plate. Individual support surfaces on the carrier plates rest on predetermined support regions on the outer lateral surface of the cage. The carrier plates are positioned via interacting positioning projections in the predetermined positions on the cage. The carrier plates, which rest against the cage, are fixed to the cage via holding rings that are slid over the carrier plates.

11 Claims, 3 Drawing Sheets

US 8,317,397 B2

LINEAR BALL BEARING

This application is a 371 of PCT/EP2008/058770 filed Jul. 7, 2008, which in turn claims the priority of DE 10 2007 036 113.2 filed Aug. 1, 2007, the priority of both applications is hereby claimed and both applications are incorporated by reference herein.

FIELD OF THE INVENTION

The invention relates to a linear ball bearing having a substantially sleeve-shaped cage for receiving a plurality of axial ball loops which are distributed over the cage circumference, each ball loop comprising a first ball channel which is open radially to the inside and to the outside for a row of loadbearing balls and a second ball channel which is open radially to the outside for a row of non-loadbearing balls and deflection channels which connect the ball channels of a ball loop to one another, and in each case at least the first ball channel being covered on the outside by a loadbearing carrying plate.

BACKGROUND OF THE INVENTION

Linear ball bearings serve the purpose of mounting shafts or the like such that these can be displaced in the longitudinal direction with respect to a stationary object, or of guiding objects on stationary axles in an axially displaceable manner. The balls which are situated in the first ball channel of each ball loop of the cage, mentioned in the introduction, of a linear ball bearing of the generic type bear directly against the shaft to be mounted, absorb the forces which load the shaft and transfer them to the carrying plate which covers the first ball channel on the outside and is supported for its part on the inner wall of a bore, into which the linear ball bearing is inserted. The first ball channel merges via the deflection channels into the second ball channel, in which the balls are returned to the first ball channel. The radially inwardly pointing opening of the first ball channel is generally narrower than the diameter of the balls, with the result that the latter cannot fall out to the inside. To the outside, the balls of the first ball channel are held by the described carrying plate which can be held, for example, by a snap action connection in corresponding recesses of the cage.

Different constructions have already been disclosed in order to prevent the balls from falling out of the second ball channel which is open to the outside and out of the adjacent deflection channels, in the case of the linear ball bearing which is assembled to form a component ready for installation and is fitted with balls. DE 197 08 370 A1 has disclosed configuring the carrying plates to be so wide that they in each case cover both the first ball channel and the second ball channel on the outside. In a first refinement which belongs to an older prior art, the carrying plates are configured in each case in one piece and are provided on the inner side with running grooves for the loadbearing balls, the non-loadbearing balls and the respectively deflected balls. Carrying plate profiles of this type are complicated and expensive to manufacture. In another exemplary embodiment of the abovementioned document, the carrying plates are configured in each case in two pieces, that is to say they comprise a carrying plate which is configured as a metal rail for the loadbearing balls and a covering plate which is configured as a plastic rail for the other sections of the ball raceway. The required expenditure for manufacturing two separate components and joining them together to form a supporting and covering plate arrangement also makes this solution expensive.

The carrying plates or supporting and covering plate arrangements of this known linear ball bearing are inserted in each case from the outside completely into corresponding recesses of the cage and are held via a snap action connection in such a way that they are flush with the outer circumferential face of the cage. This results in a comparatively high overall shape of the cage in the radial direction with a correspondingly large space requirement.

A further disadvantage of the known constructions is also seen in the fact that the load direction characteristics of the linear ball bearing are dependent on the accuracy of the alignment of the carrying plates in the cage and therefore on the manufacturing accuracy of the cage itself, which is generally not a precision component, with the result that the load direction characteristics are frequently insufficient.

Attempts have therefore already been made to avoid the described disadvantages by the cage, which has been fitted with the balls, being plugged into an outer sleeve which receives it completely, which outer sleeve absorbs the forces which act on the loadbearing balls and transfers the forces to the bore wall, and also covers the second ball channel for the non-loadbearing balls to the outside (EP 0 004 593 A1). Although linear ball bearings having outer sleeves are cheap to manufacture and also robust and in addition have satisfactory load direction characteristics, their disadvantages lie in their comparatively low accuracy, their moderate running quality and a low load rating on account of the absence of a running groove for the loadbearing balls. Moreover, high pressing forces are required for inserting the linear ball bearings into the respective receiving bore.

OBJECT OF THE INVENTION

The invention is based on the object of providing a linear ball bearing, which linear ball bearing, with as low a radial overall height of the cage as possible, combines the advantages of an embodiment with an outer sleeve, that is to say inexpensive manufacturing, robustness and satisfactory load direction characteristics, with the advantages of an embodiment with a carrying plate, that is to say high accuracy, satisfactory running quality and a high load rating, and in which linear ball bearing the high pressing forces which are typical for an embodiment with an outer sleeve are avoided.

SUMMARY OF THE INVENTION

The invention is based on the realization that at least an approximation to the sought solution is possible if the individual carrying plates can be designed in such a way that, in the mounted state, they form a structure which is at least largely similar to a closed outer sleeve.

The invention therefore proceeds from a linear ball bearing having a substantially sleeve-shaped cage for receiving a plurality of axial ball loops which are distributed over the cage circumference, each ball loop comprising a first ball channel which is open radially to the inside and to the outside for the row of loadbearing balls and a second ball channel which is open radially to the outside for the row of non-loadbearing balls and deflection channels which connect the ball channels of a ball loop to one another, and in each case at least the first ball channel being covered on the outside by a loadbearing carrying plate. According to the invention, in each case separate supporting faces which rest on predefined supporting regions on the outer circumferential face of the cage are formed on the carrying plates, the carrying plates are positioned in their predefined position on the cage via interacting positioning means which are formed firstly on the supporting faces and secondly on the supporting regions, and the carrying plates which bear against the cage are fixed on the cage by means of at least one holding ring which is pushed over said carrying plates.

Accordingly, the carrying plates are no longer inserted into recesses of the cage and fixed in said recesses by a snap action connection, as in the prior art, but rather are placed onto predefined supporting regions on the outer circumferential face of the cage by means of supporting faces which are formed on them, furthermore are positioned exactly with respect to one another and with respect to the cage via interacting positioning means, and finally are fixed by at least one holding ring which is pushed on. In this way, the carrying plates form a sleeve-like structure which substantially has the advantages of an outer sleeve which are stated further above, the advantages of the carrying plate solution being maintained, however. Since the carrying plates are no longer inserted into recesses of the cage, the radial overall height of the cage and therefore of the linear ball bearing overall can be reduced with respect to the known solution described above.

According to one preferred refinement of the invention, a first supporting face which rests on a supporting region of the cage, which supporting region lies between two ball loops, is formed on a longitudinal edge of that loadbearing face of the carrying plate which interacts with the loadbearing balls. In order to achieve as large a supporting face as possible, in its axial end regions, said first supporting face is widened in each case in the circumferential direction to form an arcuate supporting foot which rests on an end edge section of the cage.

Interacting positioning projections and positioning recesses, which engage into one another and therefore ensure an exact position of the carrying plates with respect to the cage, are formed firstly on the end edge sections of the cage and secondly on the supporting feet of the carrying plates.

After their assembly, the supporting feet of the carrying plates form a substantially closed ring which terminates axially flush with the end edge sections of the cage and onto which in each case one holding ring is pushed. In this way, the carrying plates form an approximately sleeve-like structure which, however, has only a linear contact or surface contact according to the outer circumferential face of the holding rings, as will still be explained using one exemplary embodiment, with the inner wall of the bore which receives the linear ball bearing, with the result that the pressing force which is required for mounting in this bore is reduced in comparison with customary linear ball bearings with a sleeve.

According to a further preferred refinement of the invention, the first supporting face of the carrying plate extends in the circumferential direction beyond the associated supporting region of the cage as far as above the second ball channel, which is open to the outside, of the adjacent ball loop and covers said second ball channel at least partially. In this way, the circumference of said second ball channel can be reduced in such a way that the balls which are situated in it cannot fall out.

In a further refinement of the invention, a second supporting face, which rests on a supporting region of the cage, which supporting region remains between the two ball channels of a ball loop, is formed on that longitudinal edge of the loadbearing face of the carrying plate which faces away from the first supporting face. In this way, the available supporting face for the carrying plates is increased further. Provision can be made here such that the second supporting face of the carrying plate extends in the circumferential direction beyond the associated supporting region of the cage as far as above the second ball channel, which is open to the outside, of the same ball loop and covers said second ball channel at least partially. As a result, the circumference of said ball channel can also be narrowed from the other side, with the result that the balls, which are situated in said ball channel, are held symmetrically on two sides.

The first supporting face and the second supporting face are preferably configured in such a way that they also cover in each case at least part of the deflection channels which adjoin the associated second ball channels, with the result that the balls are also secured here against falling out. That part of the deflection channels which adjoins the first ball channel can be covered at least partially by the loadbearing face of the carrying plate.

According to a further refinement of the invention, in order to achieve as satisfactory a running quality and load rating as possible, that loadbearing face of the carrying plate which covers the first ball channel and the adjacent deflection channels is provided with a running groove for the balls.

In a further refinement of the invention, in order to hold the balls which are returned in the second ball channel with as little friction as possible in the ball channel, the end edges of the first and second supporting faces which protrude over the second ball channels in each case have a profile which is adapted to the shape of the covered balls, as will likewise be shown more precisely using the exemplary embodiment.

The carrying plates with the loadbearing face provided with a running groove and the supporting faces which are arranged or formed thereon are preferably manufactured by means of a sheet metal shaping operation, that is to say by stamping out and pressing, for example.

BRIEF DESCRIPTION OF THE DRAWINGS

The invention will be explained in greater detail in the following text with reference to one embodiment and using the appended drawing, in which.

DETAILED DESCRIPTION OF THE DRAWINGS

Figure 1:
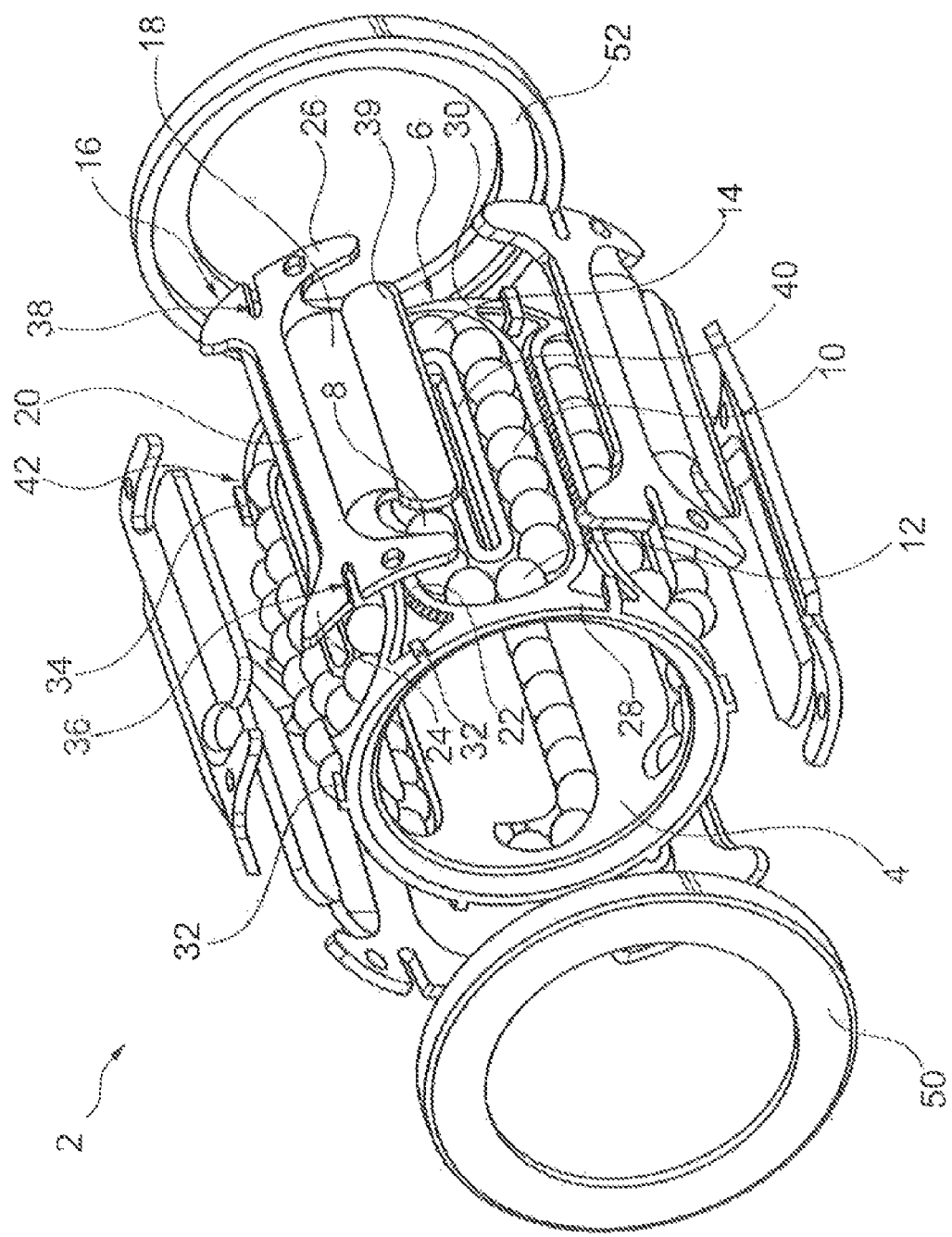
FIG. 1 shows an exploded illustration of a linear ball bearing according to the invention in a perspective view.
Figure 2:
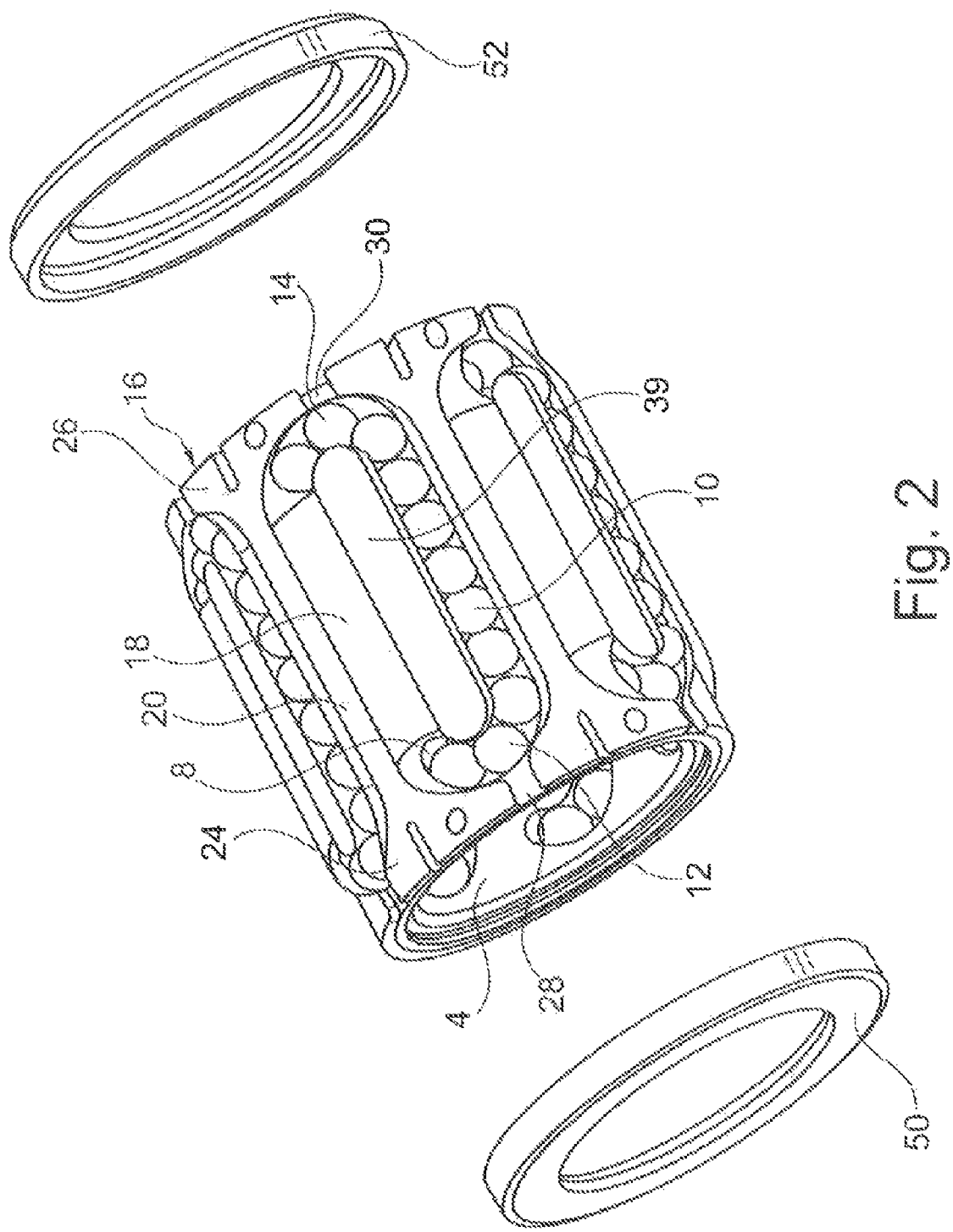
FIG. 2 shows the linear ball bearing according to FIG. 1 in a partially assembled state.

FIGS. 1 to 4 show one preferred exemplary embodiment of the invention in different mounting states and illustrations.

The linear ball bearing 2 comprises a substantially sleeve-like cage 4 for receiving a plurality (six in this exemplary embodiment) of axial ball loops which are distributed over the cage circumference, each ball loop comprising a first ball channel which is open radially to the inside and to the outside for the row of loadbearing balls and a second ball channel which is open radially to the outside for the row of non-loadbearing balls and deflection channels which connect the ball channels of a ball loop to one another. Cages of this type are known per se and therefore do not have to be described in detail here.

The individual ball loops of the linear ball bearing 2 are of identical construction, with the result that the invention is described in greater detail in the following text using a single ball loop 6. The ball loop 6 is formed by loadbearing balls 8 which are situated in a first ball channel, the non-loadbearing balls 10 which are situated in a second ball channel, and the balls 12 and 14 which are situated in the deflection channels. The forces which are transmitted to the loadbearing balls 8 by a shaft to be mounted (not shown) are absorbed by a carrying plate, which is denoted overall by 16, and are passed on to a bore wall (likewise not shown) which receives the linear ball bearing. To this end, the carrying plate 16 has a loadbearing face 18 which covers the row of loadbearing balls 8.

Separate supporting faces which rest on predefined supporting regions on the outer circumferential face of the cage 4 are formed on the carrying plate 16. To this end, a first supporting face 20 which, in the mounted state, rests on a supporting region 22 of the cage 4, which supporting region 22 lies between two ball loops, is formed on a longitudinal edge of the loadbearing face 18 of the carrying plate 16.

In its axial end regions, the first supporting face 20 widens in each case in the circumferential direction to form an arcuate supporting foot 24 and 26 which rests on an end edge section 28 or 30, respectively, of the cage 4.

Positioning projections 32 and 34 are formed on the end sections 28 and 30, respectively, of the cage 4, which positioning projections 32 and 34 interact with positioning recesses 36 and 38, respectively, which are formed on the supporting feet 24 and 26, and ensure a precise position of the carrying plate 16 on the cage 4.

A second supporting face 39 which rests on a supporting region 40 of the cage 4, which supporting region 40 remains between the two ball channels of a ball loop, is formed on that longitudinal edge of the loadbearing face 18 of the carrying plate 16 which faces away from the first supporting face 20.

Figure 4:
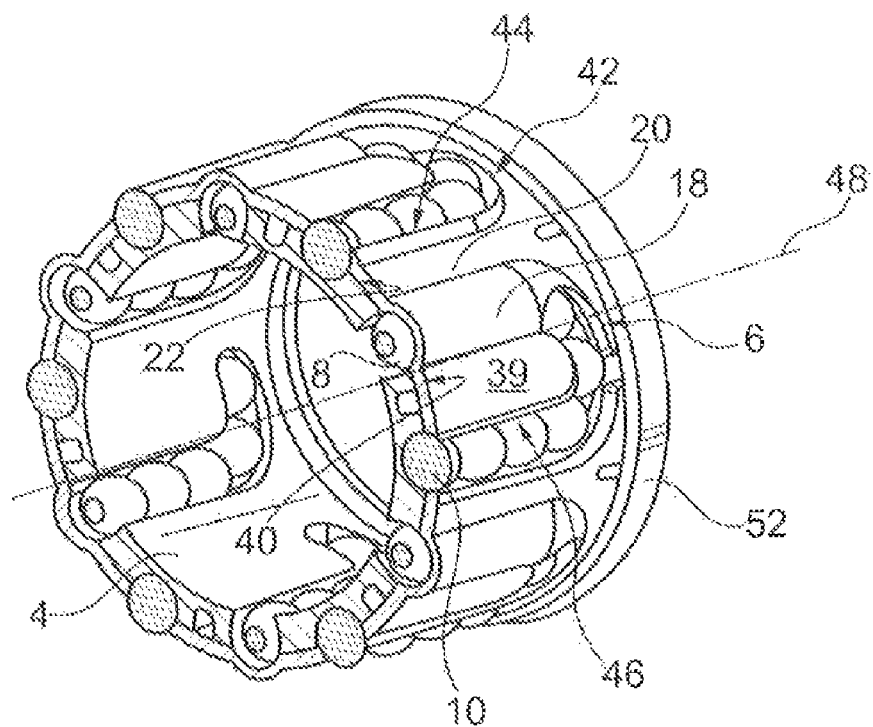
FIG. 4 shows a cross section through the linear ball bearing of FIG. 3.

As can be seen, in particular, in FIG. 4, the first supporting face 20 extends in the circumferential direction beyond the associated supporting region 22 of the cage 4 as far as above the second ball channel, which is open to the outside, of the adjacent ball loop 42 and covers said second ball channel at least partially. Moreover, the second supporting face 39 extends in the circumferential direction beyond the associated supporting region 40 of the cage as far as above the second ball channel, which is open to the outside, of the same ball loop and covers said second ball channel partially. In this way, the second ball channels which guide the non-loadbearing balls are narrowed in each case to the outside to such an extent that the balls cannot fall out of them.

Figure 3:
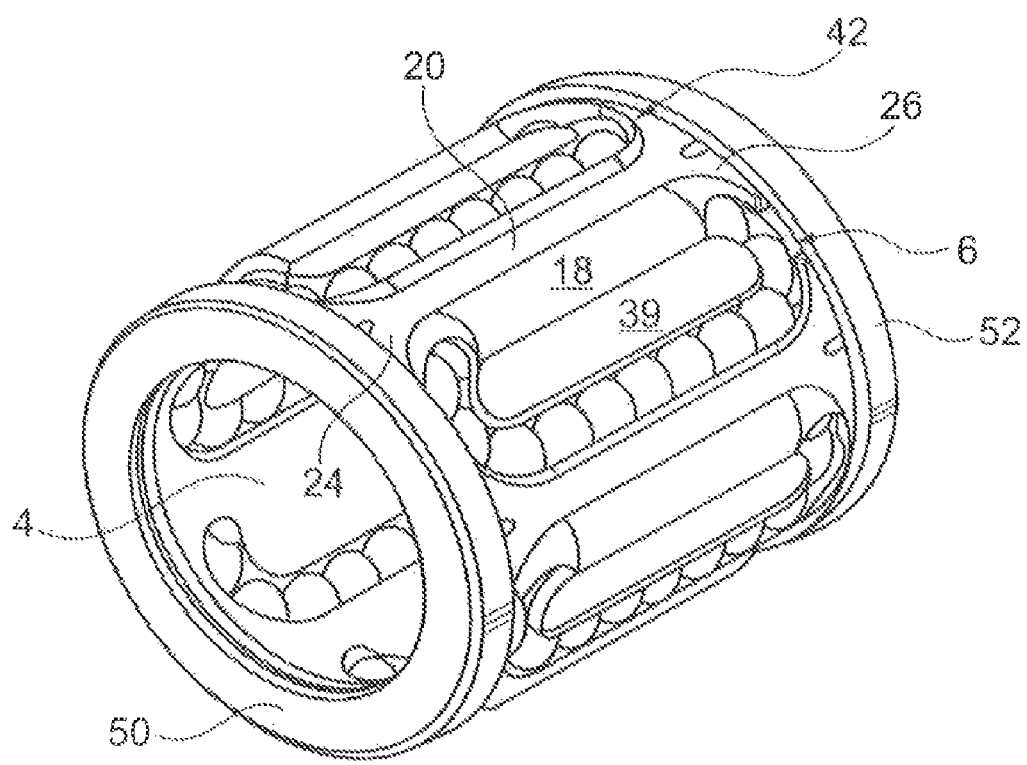
FIG. 3 shows the linear ball bearing according to FIGS. 1 and 2 in the completely assembled state.

As FIG. 3, in particular, makes clear, the second supporting face 39 also partially covers in each case part of the two deflection channels, with the result that the balls are also secured against falling out here. As can be seen, furthermore, from FIGS. 3 and 4, the loadbearing face 18 which covers the first ball channel with the loadbearing balls 8 and adjoining sections of the deflection channels is provided radially on the inside with a running groove for exact guidance of the loadbearing balls 8.

The end edge 44 of the first supporting face 20 and the end edge 46 of the second supporting face 38 are profiled in each case in such a way that they are adapted to the shape of the balls to be covered.

After the balls have been filled into the ball loops and the carrying plates 16 have been positioned onto the ball loops, the holding rings 50, 52 are pushed onto the axial ends of the assembly which has been preassembled in this way, with the result that the carrying plates 16 are fixed on the cage 4.

As FIG. 4 shows, the radial height of the cage 4 is approximately half as large as the diameter of the balls and therefore considerably smaller than, for example, in the construction of DE 197 08 370 A1 which was cited in the introduction, with the result that overall a lower radial height of the linear ball bearing 2 can be achieved.

As can be seen, furthermore, from FIG. 4, in particular, the radially outermost zones of the linear ball bearing 2 are the crown lines 48 of the loadbearing faces 18, via which the forces are transmitted to the receiving bore for the linear ball bearing 2, and optionally the circumferential faces of the holding rings 50 and 52, with the result that the required pressing force for inserting the linear ball bearing into the receiving bore is comparatively low. The carrying plates 16 and preferably also the holding rings 50, 52 are configured in each case as single-piece shaped sheet metal parts.

LIST OF DESIGNATIONS

2 Linear ball bearing
4 Sleeve-like cage
6 Ball loop
8 Load-bearing ball
10 Non-load-bearing ball
12 Ball
14 Ball
16 Carrying plate
18 Loadbearing face
20 First supporting face
22 Supporting region
24 Supporting foot
26 Supporting foot
28 End edge section
30 End edge section
32 Positioning projections
34 Positioning projections
36 Positioning recess
38 Positioning recess
39 Second supporting face
40 Supporting region
42 Adjacent ball loop
44 End edges
46 End edge
48 Crown line
50 Holding ring
52 Holding ring

The invention claimed is:

1. A linear ball bearing, comprising:
a cage for receiving a plurality of axial ball loops which are distributed over a circumference of the cage, each of the ball loops having a first ball channel which is open radially to an inside and to an outside for a row of load-bearing balls, a second ball channel which is open radially to an outside for a row of non-load-bearing balls and deflection channels which connect the first ball channel and the second ball channel to one another, the cage having end edge sections and an outer circumferential face with predefined supporting regions and the supporting regions having positioning projections;
at least one holding ring; and
load-bearing carrying plates covering at least the first ball channel on the outside, the carrying plates having supporting faces with positioning recesses, which rest on the supporting regions on the outer circumferential face of the cage,
wherein the carrying plates are positioned in a predefined position on the cage via positioning projections and the positioning recesses,
wherein the carrying plates, which bear against the cage, are fixed on the cage by the at least one holding ring, which is pushed over the carrying plates,
wherein one of the supporting faces, which rests on one of the supporting regions of the cage that lies between two of the ball loops, is formed on a longitudinal edge of a load-bearing face of the carrying plates that interacts with the load-bearing balls, and wherein the supporting faces, in axial end regions, are each widened in a circumferential direction to form an arcuate supporting foot, which rests on the end edge sections of the cage.

2. The linear ball bearing of claim 1, wherein the positioning projections are formed on each of the end edge sections of the cage and the positioning recesses are formed in each supporting foot.

3. The linear ball bearing of claim 1, wherein the supporting foot of the carrying plates form a substantially closed ring which terminates axially flush with each of the end edge sections of the cage and the holding ring is pushed onto the supporting ring.

4. The linear ball bearing of claim 1, wherein the one of the supporting faces of the carrying plate of one of the ball loops extends in the circumferential direction beyond the supporting region so as to at least partially cover the second ball channel of another ball loop that is positioned adjacent to the one ball loop.

5. The linear ball bearing of claim 1, wherein the carrying plates have second supporting faces, which rest on a second supporting region of the cage between the first ball channel and the second ball channel of the ball loops.

6. The linear ball bearing of claim 5, wherein the second supporting face of each of the carrying plates extend in the circumferential direction beyond the second supporting region of the cage, above the second ball channel of the ball loops and at least partially covers the second ball channel.

7. The linear ball bearing of claim 6, wherein the first supporting face and the second supporting face have end edges, which protrude over the second ball channels and have a profile which is adapted to a shape of the load-bearing balls and the non-load-bearing balls that are covered.

8. The linear ball bearing of claim 5, wherein the first supporting face and the second supporting face covers at least part of the deflection channels which adjoin the second ball channels.

9. The linear ball bearing of claim 1, wherein the load-bearing face of the carrying plates at least partially cover the deflection channels which adjoins the first ball channel.

10. The linear ball bearing of claim 9, wherein the load-bearing face of the carrying plates, which covers the first ball channel and the adjacent deflection channels, has a running groove.

11. The linear ball bearing of claim 1, wherein the carrying plates are as single-piece shaped sheet metal parts.

* * * * *